(12) United States Patent
Mine et al.

(10) Patent No.: US 7,256,558 B2
(45) Date of Patent: Aug. 14, 2007

(54) BRUSHLESS MOTOR AND DISK DRIVE DEVICE USING THE SAME

(75) Inventors: Naoki Mine, Kyoto (JP); Eiji Miyamoto, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 11/194,742

(22) Filed: Aug. 2, 2005

(65) Prior Publication Data

US 2006/0022621 A1    Feb. 2, 2006

(30) Foreign Application Priority Data

Aug. 2, 2004    (JP)    ............................. 2004-226160

(51) Int. Cl.
*H02P 5/00* (2006.01)
*H02P 5/46* (2006.01)

(52) U.S. Cl. ..................... 318/66; 318/59; 318/138; 318/439; 318/254

(58) Field of Classification Search ................. 318/59, 318/66, 138, 254, 439, 432–434, 700
See application file for complete search history.

(56) References Cited

U.S. PATENT DOCUMENTS 3,246,307 A * 4/1966 Stanley .................... 360/77.06
4,197,489 A * 4/1980 Dunn et al. ................. 318/138
6,034,499 A * 3/2000 Tranovich .................... 318/650

FOREIGN PATENT DOCUMENTS

| JP | 08-172763 | 7/1996 |
| JP | 10-79161 | 3/1998 |
| JP | 2000-182305 | 6/2000 |

* cited by examiner

*Primary Examiner*—Lincoln Donovan
*Assistant Examiner*—Tyrone Smith
(74) *Attorney, Agent, or Firm*—Westerman, Hattori, Daniels & Adrian, LLP

(57) ABSTRACT

A brushless motor according to the present invention provided with a recording disk in a rotational member and serving to rotate the recording disk together with the rotational member comprises a first position detecting means for detecting a rotational position of the rotational member, a second position detecting means for detecting a rotational position of the recording disk, wherein a mode for rotating the rotational member at a high speed by a detection signal of the first position detecting means and a mode for rotating the rotational member at a low speed by a detection signal of the second position detecting means are generated. Thereby, the two rotation states whose rotation speeds are different can be obtained in a simplified constitution.

6 Claims, 5 Drawing Sheets

BRUSHLESS MOTOR AND DISK DRIVE DEVICE USING THE SAME

BACKGROUND OF THE INVENTION

1. Field of the Invention

The present invention relates to a brushless motor used for rotating a recording disk such as CD and DVD and a disk drive device in which the brushless motor is installed.

2. Background Information

In general, a brushless motor for rotating a discoid recording disk comprises a fixing-side frame, a shaft rotatably supported by the fixing-side frame via a bearing, a rotor mounted on the shaft and rotated integrally with the shaft, a rotor magnet mounted on the rotor, and a stator supported by the fixing-side frame at a position opposing to the rotor magnet. Further, the rotor is provided with a turn table on which the disk is disposed, and the disk is rotated by rotating the rotor in the state in which the disk is disposed on the turn table.

The stator comprises a stator core having a plurality of teeth, and stator windings of, for example, three phases wound around the respective teeth of the core. The rotor magnet is formed in, for example, a cylindrical shape, and magnetized in a multipolar manner in such manner that different magnetic poles are circumferentially alternately arrayed. When a direction of a current distributed to the stator windings of the respective phases is changed, magnetic poles of the stator are rotated in one direction, which repeatedly generates attraction and repulsion relative to the magnetic poles of the rotor magnet. As a result, the rotor can obtain a rotating force.

In the foregoing constitution, as a means for detecting the magnetic poles of the rotor magnet and a rotational position of the rotor in order to change the current distribution with respect to the stator windings of the respective phases, a plurality of position detecting sensors (for example, three corresponding to the respective phases) such as Hall elements is disposed on the fixing-side frame in such manner that the respective sensors are shifted by a predetermined phase. Usually, the position detecting sensors are disposed on a circuit substrate provided on a lower side of the rotor magnet and secured to the fixing-side frame, and also disposed on a radially inner side relative to the rotor magnet and between the adjacent teeth of the stator core.

In recent years, a digital data processing speed has been increasingly advancing, in response to which the disk rotation has successfully attained a higher speed in the disk rotation motor of the foregoing type. As a recent trend, high-speed data recording and reproduction are realized by rotating the disk at such a high speed as, for example, approximately 12,000 rpm. However, it is contradictorily demanded to rotate the disk, which is installed in the high-speed disk rotation motor, at a low speed (for example, at most 100 rpm) using the motor. For example, in the case of rendering/printing data in various manners on a label surface (surface contrary to a recording surface) of the disk using a laser-type pickup device for recording and reproducing the data on the recording surface of the disk, it is necessary to rotate the disk at a low speed. However, it was almost impossible to respond to the demands that the low-speed rotation control and the high-speed rotation control are both satisfied by the rotation control of the conventional brushless motor in which only the position detecting sensors such as the Hall elements are provided.

A possible method in order to satisfy the foregoing demands which is conventionally employed is that the rotor is controlled to rotate at a high speed using the position detecting sensors such as the Hall elements, while an encoder is combined with a rotation shaft of the rotor so that a FG pulse required for controlling the low-speed rotation is generated from a rotation detection signal of the encoder and used to control the low-speed rotation. However, in the aforementioned method, the additional provision of the encoder results in complicating the structure and increasing costs. As a result, it becomes disadvantageously difficult to downsize the entire motor.

SUMMARY OF THE INVENTION

A main object of the present invention is to provide a brushless motor capable of controlling rotations including a low-speed rotation and a high-speed rotation in a simplified constitution and a disk drive device in which the brushless motor is installed.

Another main object of the present invention is to inexpensively provide a brushless motor capable of controlling rotations including a low-speed rotation and a high-speed rotation and a disk drive device in which the brushless motor is installed.

Still another main object of the present invention is to provide a brushless motor capable of controlling rotations including a low-speed rotation and a high-speed rotation and a disk drive device in which the brushless motor is installed in a downsizing manner.

A brushless motor according to the present invention capable of achieving the aforementioned objects comprises: a first position detecting means for supporting a rotor having a turn table on which a discoid recording disk is installed so as to freely rotate relative to a motor frame and detecting a rotational position of the rotor relative to a stator; and a second position detecting means for detecting rotation information generated on the disk, the second detecting means disposed in vicinity of the rotor of the motor frame and facing the discoid disk on the turntable, wherein a high-speed rotation mode for rotating the rotor at a high speed by a detection signal from the first position detecting means and a low-speed rotation mode for rotating the rotor at a low speed by a detection signal from the second rotation detecting means are generated.

According to the brushless motor of the present invention, it provides the mode for controlling the rotation of the rotor by the detection signal from the first detecting means and the mode for controlling the rotor by the detection signal from the second detecting means. Thereby, the rotor can be rotation-controlled in different speed regions, which are the low speed and high speed, the rotation controls at the different two speeds can be realized in the simple constitution. Further, the constitution according to the present invention is inexpensive because the pattern on the disk is utilized so as to control the low-speed rotation, which makes it unnecessary to provide such an expensive speed detecting means as an encoder.

When the disk drive device comprises the foregoing brushless motor, an optical disk can be rotation-controlled not only at the high speed but also at the low speed, which offers a broader range of use. Further, the entire device can be downsized because the speed detecting means such as the encoder can be omitted.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
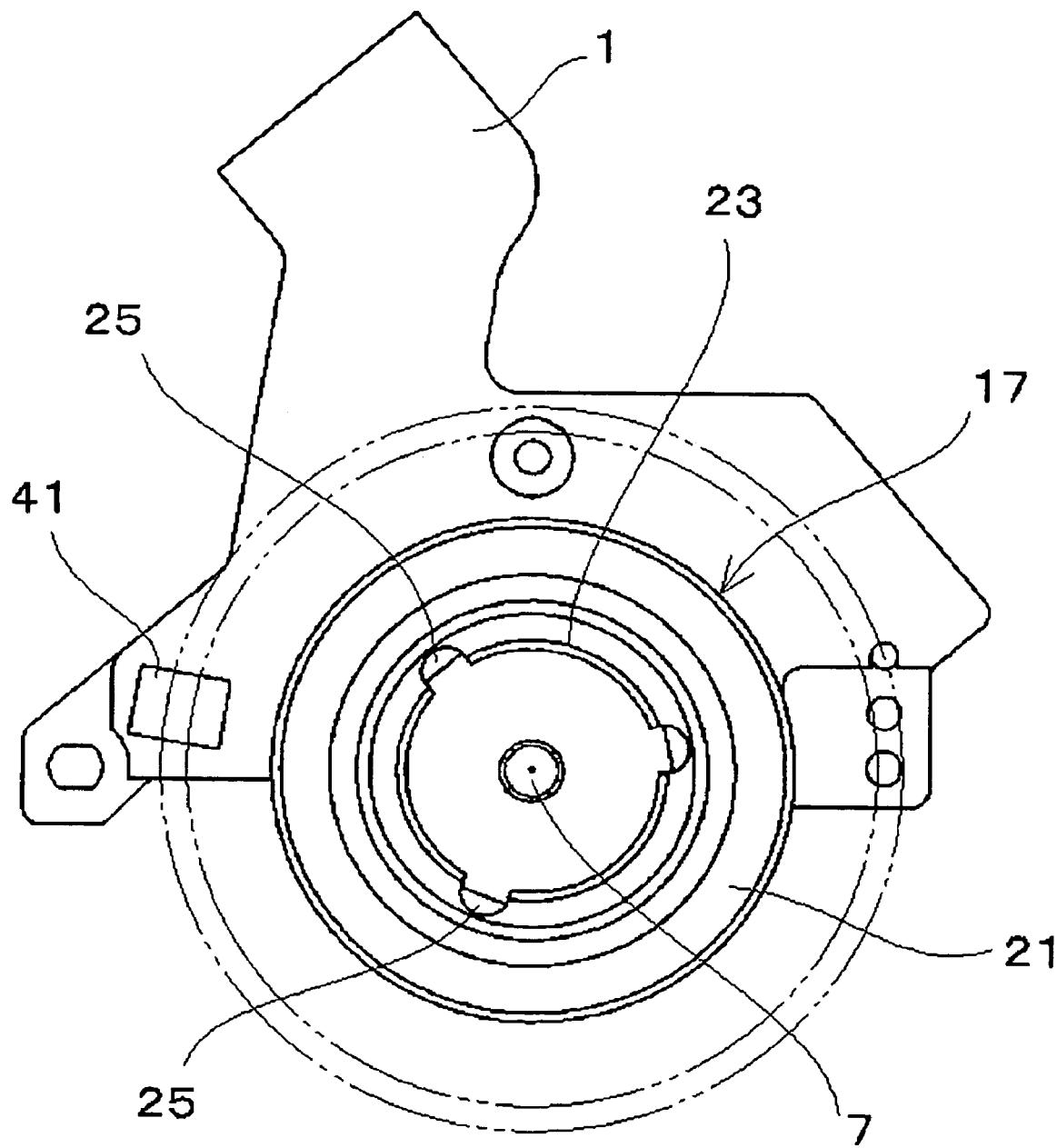
FIG. 1 is a plan view of a brushless motor according to a preferred embodiment of the present invention.

A preferred embodiment of the present invention, in which a brushless motor according to the present invention is used in driving a discoid optical recording disk such as CD and DVD, is described referring to the drawings.

Figure 3:
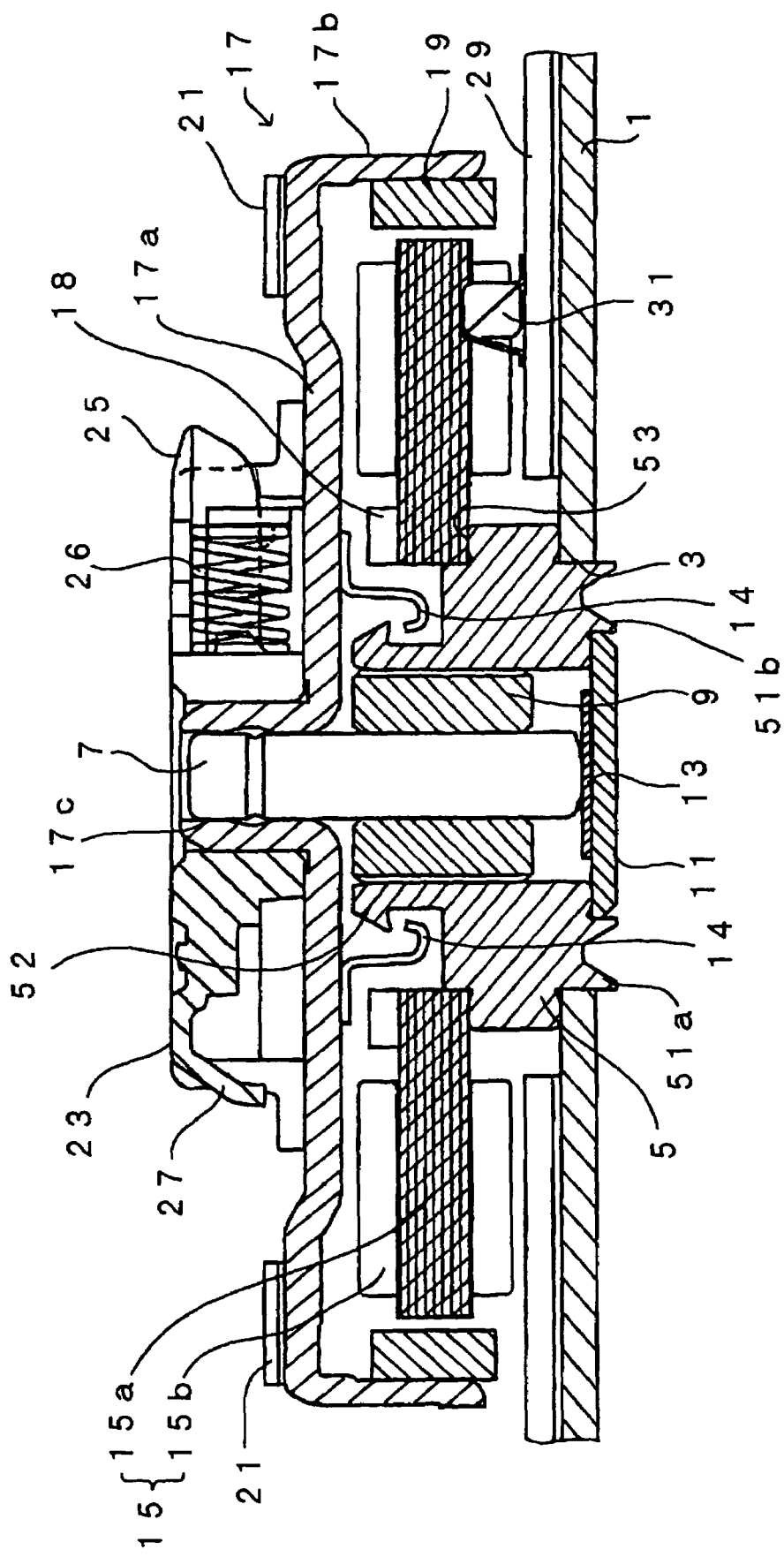
FIG. 3 is a sectional view of a motor section in the brushless motor shown in FIG. 2.

FIG. 3 is a sectional view of a structure of a motor section in the brushless motor, wherein a circular through hole 3 is formed in a motor frame 1 formed from a metal-plate member, a bush 5 having a substantially cylindrical shape and formed from iron, SUS or the like is inserted into the through hole 3, and an outer-side caulked part 51a on a lower side of the bush 5 is plastically deformed in an outer peripheral direction thereof so that the bush 5 is caulked to be thereby secured to the frame 1. On an inner side of the bush 5 is housed a cylindrical sleeve bearing 9 serving as a sliding bearing through which a shaft 7 is inserted. A bottom opening of the bush 5 is sealed by a seal plate 11, and a circular thrust strike plate 13 is disposed on an upper surface of the seal plate 11 in the bush 5. A lower end of the shaft 7 inserted through the sleeve bearing 9 abuts the thrust strike plate 13. The shaft 7 is pressed onto the thrust strike plate 13 by an attraction force of a preload magnet described later, and the thrust strike plate 13 supports a thrust load. The thrust strike plate 13 is caulked to be thereby secured to the bush 5 as a result of the plastic deformation of an inner-side caulked part 51b in the bush 5.

An upper part of the bush 5 has a thin cylindrical shape having a small outer diameter. In an upper end of the thin cylindrical shape is formed a coronoid part 52 bent radially outward. A hook member 14 mounted on an inner side of the rotor, which will be described later, is engaged with the coronoid part 52 so that the rotor and the shaft 7 described later do not slip off the bush 5. An annular basic part of a stator core 15a is fitted to a stepwise part 53 formed at a central part in an outer periphery of the bush 5. Stator windings 15b are wound around a plurality of teeth protruding radially outward from the annular basic part, which constitutes a stator 15.

A rotor 17 formed in a substantially reversed cup shape and formed from a magnetic material such as iron comprises a main body part 17a having a disk shape, a drooping part 17b drooping downward from an outer periphery of the main body part 17a and a cylindrical part 17c formed at the center of the main body part 17a in such manner as protruding upward, and is formed through press forming.

The cylindrical part 17c of the rotor 17 is fitted to an upper end of the shaft 7 so that the rotor 17 rotates integrally with the shaft 7. To an upper surface of the annular basic part of the stator core 15a is fixedly fitted an annular preload magnet 18 facing the main body part 17a of the rotor 17 and serving to magnetically attracting the rotor 17 so as to supply a thrust force to the rotating body including the rotor 17. The thrust force presses the lower end of the shaft 7 onto the thrust strike plate 13 so that a thrust position of the rotor 17 is maintained.

A cylindrical rotor magnet 19 is fixedly fitted to an inner peripheral surface of the drooping part 17b of the rotor 17, and the rotor magnet 19 faces an outer peripheral surface of the plurality of teeth of the stator 15. An upper surface of the main body part 17a of the rotor 17 functions as a discoid turn table serving as a mounting section on which the disk such as CD and DVD is mounted, and a cushioning material 21 formed from an annular rubber is mounted on the outer peripheral upper surface of the main body part 17a as the turntable. The disk is disposed via the cushioning material 21.

At the center of the main body part 17a of the rotor 17, a center boss part 23 formed from a non-magnetic material into which a center hole of the disk fits is disposed. The center boss part 23 is fitted to the outer periphery of the cylindrical part 17c to be thereby secured thereto. The center boss part 23 is provided with a plurality of moving members 25 substantially circumferentially spaced at equal intervals so as to freely radially move. The moving members 25 are energized radially outward by a spring 26 retained inside of the moving members 25, and claw-shaped edge parts of the moving members 25 are protruded from a peripheral surface of the center boss part 23. When the disk is mounted in such manner that the center boss part 23 is fitted into the center hole of the disk, an inner peripheral edge of the disk pushes the respective moving members 25 toward the center against the spring 26. When the disk is mounted at a position at which the disk abuts the cushioning member 21, the edge parts of the respective moving members 25 are placed on an inner peripheral surface of the center hole and the force of the spring 26 makes the respective moving members 25 press the disk onto the turn table (main body part 17a) so that the disk is disposed on the main body part 17a of the rotor 17 as the turn table. An elastic plurality of center-aligning claws 27 is provided between the moving members 25 on an outer peripheral wall of the center boss part 23. The elastic center-aligning claws 27 abut the inner peripheral edge of the disk when the disk is mounted so that the center of the disk can be adjusted.

A circuit substrate 29 formed from FPC is provided on an upper surface of the motor frame 1. On the circuit substrate 29 is mounted a plurality of (three in the preset embodiment) Hall elements 31 as a first position detecting means for detecting a rotational position of the rotor 17. The respective Hall elements 31 are disposed on an inner peripheral side of the rotor magnet 19, between the adjacent teeth of the stator core 15a and closer to the outer periphery of the teeth. Provided that the number of the teeth of the stator core 15a is 12 and the stator windings 15b are of three phases, the Hall elements 31 are provided in respective three adjacent slots.

The Hall elements 31 each have a magnetic sensitive surface facing in a tilting direction relative to an axial direction of the shaft 7, and the magnetic sensitive surfaces are provided so as to oppose to the rotor magnet 19. More specifically, the Hall elements are tilted when housed in an element case having a cubic shape so that the magnetic sensitive surfaces thereof face in a nearly horizontal direction relative to a vertical direction as the axial direction of the shaft 7. The Hall elements in the case are directly disposed on the circuit substrate 29 to be thereby positioned inside a predetermined slot in the stator core 15a and soldered to a print pattern of the circuit substrate 29. The present embodiment is not limited to the Hall elements having the magnetic sensitive surfaces tilted relative to the axial direction of the shaft 7, and Hall elements having magnetic sensitive surfaces facing in the axial direction may be alternatively used. Further, the first position detecting means is not limited to the Hall elements 31.

Figure 2:
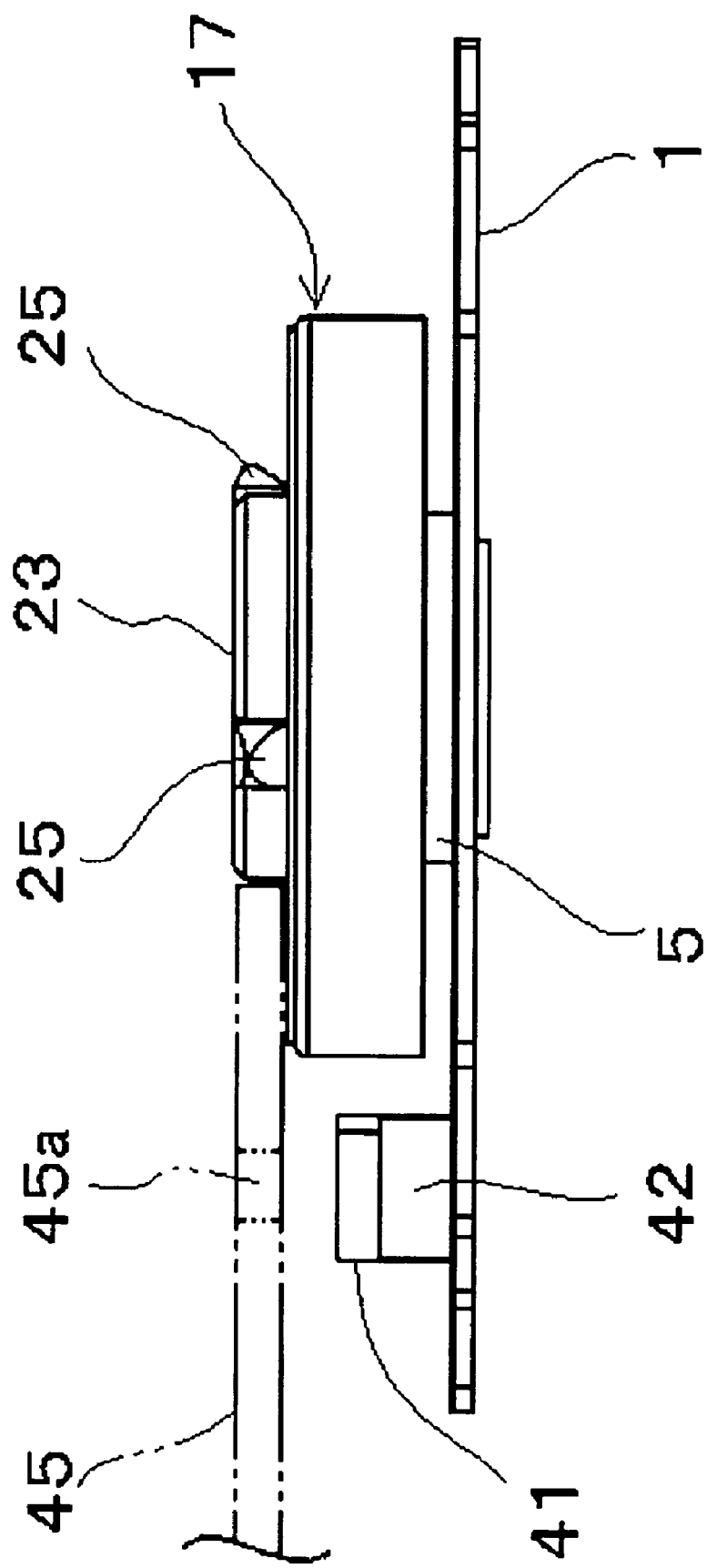
FIG. 2 is a front view of the brushless motor shown in FIG. 1.

FIGS. 1 and 2 respectively show the entire structure of the brushless motor. A photo sensor 41 as a second position detecting means is provided in the vicinity (right-hand side in the drawing) of the rotor 17 in the motor frame 1. The photo sensor 41 has a detecting surface on an upper surface thereof, and is disposed at a position on the motor frame 1 slightly lower than a disk mounting surface of the turn table of the rotor 17 using a pedestal 42. When a discoid recording disk 45 is disposed on the turn table, the detecting surface of the photo sensor 41 faces the recording disk 45 with a very small interval (approximately 2 mm) therebetween.

Figure 4:
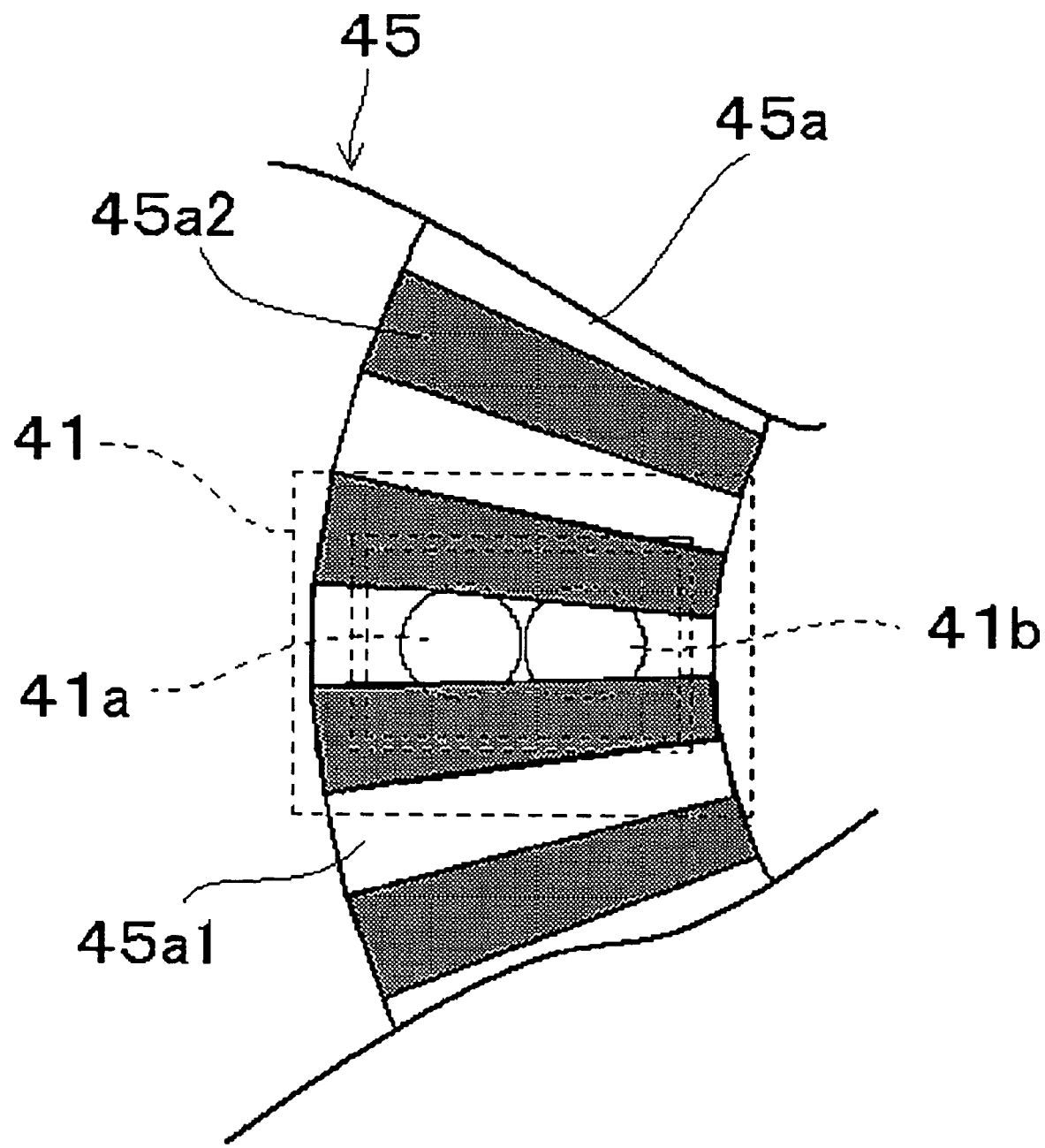
FIG. 4 is a partial plan view illustrating a relationship among the brushless motor shown in FIG. 1, a photo sensor and a disk.

As described earlier, the recording disk 45 is supported when the center hole thereof is fitted to the center boss part 23 so that the inner peripheral part of the disk is mounted on the disk mounting surface of the rotor 17. An annular pattern formation part 45*a* is concentrically formed between the inner peripheral part of the disk 45 and a recording region on an outer peripheral side of the disk. Therefore, when the disk 45 is mounted on the rotor 17, the photo sensor 41 on the motor frame 1 faces the pattern formation part 45*a*. As shown in FIG. 4, in the pattern formation part 45*a* of the disk 45, a reflection pattern part 45*a*1 and a non-reflection pattern part 45*a*2 each having a predetermined circumferential width are alternately circumferentially arrayed. A light emitted from a light emitting part 41*a* of the photo sensor 41 is reflected on the reflection pattern 45*a*1 and then received by a light receiving part 41*b*, while the light from the light emitting part 41*a* is not received by the light receiving part 41*b* because the light is absorbed in the non-reflection pattern part 45*a*2. As a result, a pulse signal in accordance with a contrast pattern formed by the pattern formation part 45*a* is obtained from the photo sensor 41. The recording surface of the recording disk 45 is formed on one surface of the disk, and the pattern formation part 45*a* is formed on an opposite side relative to the recording surface of the disk 45.

Figure 5:
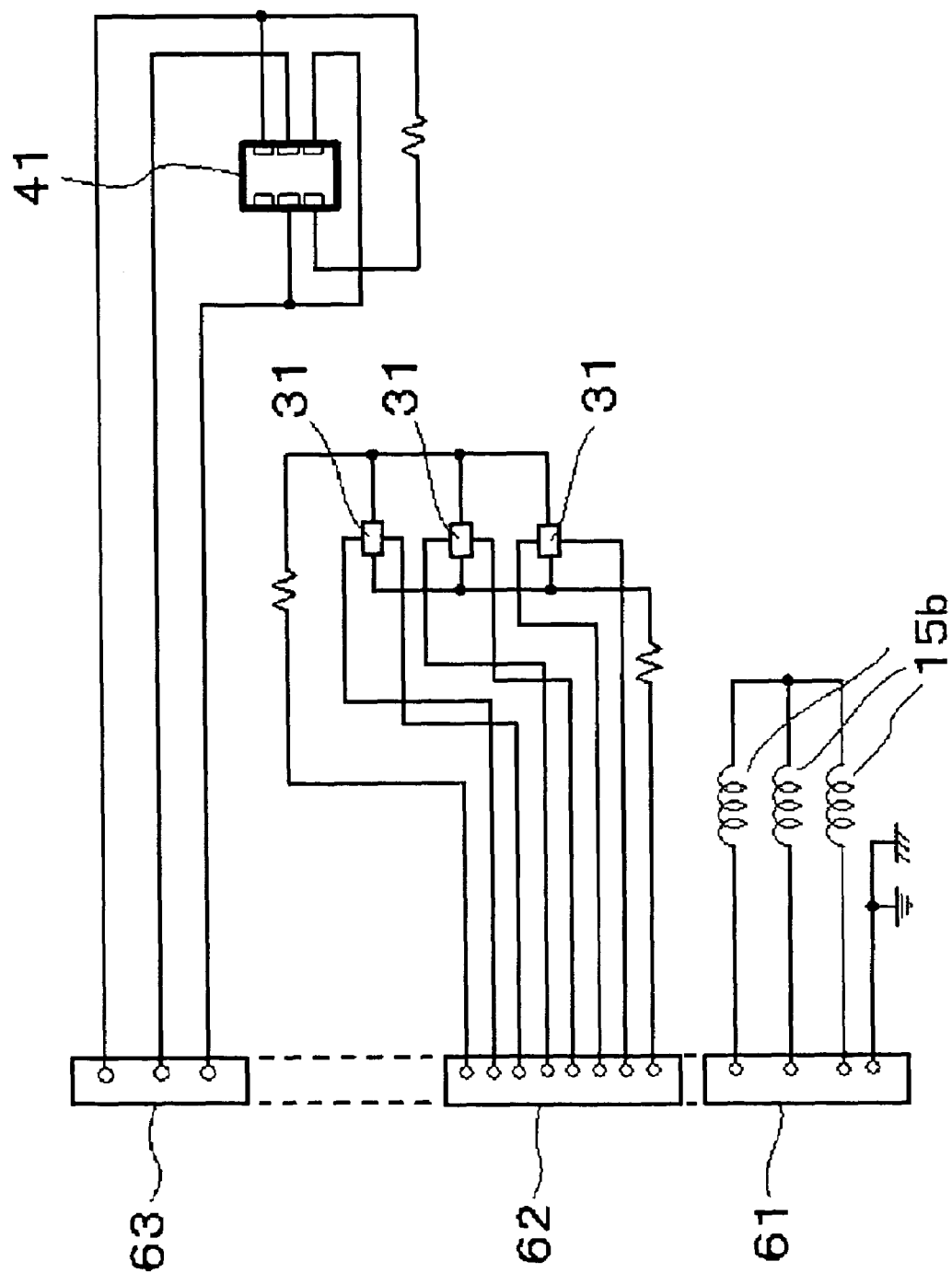
FIG. 5 is an electrical connection diagram of the brushless motor shown in FIG. 1.

FIG. 5 is a circuit diagram in the brushless motor according to the present embodiment, wherein a circuit configuration formed on the circuit substrate 29 on the motor frame 1 is shown. The stator windings 15*b* of the three phases are star-connected connected and then connected to a connector 61. Power-supply lines and signal lines of the three Hall elements 31 are connected to a connector 62. A power-supply line and a signal line of the photo sensor 41 are connected to a connector 63. These connectors 61 through 63 are integrally or individually mounted on the circuit substrate 29 to be thereby connected to a device-side circuit of the disk drive device in which the motor is installed.

In the device-side circuit is incorporated a motor drive control circuit having a function of switching to and from modes, which are a high-speed rotation mode and a low-speed rotation mode. The motor drive control circuit supplies power to the stator windings 15*b* of the three phases in a switching manner in accordance with position detection signals from the Hall elements 31 and controls the rotation at a high speed (for example, 12,000 rpm) based on a speed control signal (CLV, CAV) supplied from the device side when the high-speed rotation mode is set. When the low-speed rotation mode is set, the motor drive control circuit supplies power to the stator windings 15*b* of the three phases in the switching manner in accordance with position detection signals (pattern signals) from the photo sensor 41 and controls the rotation at a low speed (for example, 40-100 rpm) based on the speed control signal (CLV, CAV) supplied from the device side.

As described, the foregoing brushless motor is provided inside the disk drive device, and in the disk drive device, a pickup device of a laser type for accessing the disk surface is provided so as to move in the radial direction of the disk 45 on the motor-frame-1 side relative to the disk 45 mounted on the disk mounting surface of the rotor 17.

When the disk 45 is mounted on the disk mounting surface of the rotor 17 in the state in which the recording surface thereof faces the motor-frame-1 side and a recording/reproducing operation with respect to the disk is carried out, the device-side circuit selects the high-speed mode, and the power supply with respect to the stator windings 15*b* is initiated. Further, the rotor 17 is controlled to rotate at a high speed based on the position detection signals from the three Hall elements 31, and operations such as read and write of information is carried out to the recording surface of the disk 45 by the operation of the pickup device.

In contrast, when the disk 45 is mounted on the disk mounting surface of the rotor 17 in the state in which the recording surface thereof faces the opposite side relative to the motor-frame-1 side and an operation for a print processing with respect to a label surface of the disk is carried out, the device-side circuit selects the low-speed mode and the power supply with respect to the three stator windings 15*b* is initiated. Further, the photo sensor 41 executes the position detection with respect to the pattern formation part 45*a* of the disk 45, as a result of which the rotor 17 is controlled to rotate at a low speed based on the position detection signal from the photo sensor 41. Therefore, a laser irradiation on the disk 45 rotated at the low speed by the pickup device is controlled in accordance with preset rendering data so as to execute the rendering processing (print processing) to the label surface.

According to the foregoing embodiment, it becomes unnecessary to generate an FG pulse using a conventional encoder when the motor is rotated at a low speed as far as the photo sensor 41 is disposed in the vicinity of the rotor 17. Therefore, the present embodiment can offer a not only a simplified but also downsized structure, and further, an inexpensive structure. In the case of the low-speed rotation, the rotation speed of the disk 45 can be controlled through the detection of the pattern formation part 45*a* formed on the disk 45 to be rotated itself, which realizes a stable control in the low-speed rotation.

The present invention is not limited to the foregoing embodiment and can be modified in various manners other than the embodiment within the scope thereof. For example, the photo sensor 41 provided in the vicinity of the rotor 17 in the motor frame 1 is mounted on the motor frame 1 via the pedestal 42 as a separate member. As an alternative constitution, the pedestal 42 may be integrally formed in the motor frame 1 in a cut-and-raised manner on which the photo sensor 41 is mounted.

What is claimed is:

1. A brushless motor for rotating a recording disk which is installed thereon when the brushless motor stops, the recording disk having a pattern thereon, the brushless motor comprising:

a stationary member;

a rotational member rotating relative to the stationary member, the rotational member having a disk mounting part on which the recording disk is installed;

a first position detecting means for detecting a first rotational position of the rotational member, wherein a detection signal of the first position detecting means is used for controlling the brushless motor at a first rotating speed;

a second position detecting means for detecting the pattern formed on the disk installed on the disk mounting part, wherein a detection signal of the second position detecting means is used for controlling the brushless motor at a second rotating speed different from the first rotating speed.

2. A brushless motor as claimed in claim 1, wherein the second position detecting means is formed by an optical detecting element for optically detecting the pattern formed on the recording.

3. A brushless motor as claimed in claim 1, wherein the rotational member includes a magnet, and the first position detecting means is formed by a magnetic detecting element for detecting a magnetic flux density of the magnet.

4. A brushless motor as claimed in claim 1, wherein the second rotating speed is slower than the first rotating speed.

5. A disk drive device in which the brushless motor claimed in claim 1 is installed, wherein the recording disk mounted on the turn table of the motor is an optical disk, and a pickup device of a laser type for performing a recording/reproducing operation to the disk is further provided on the motor-frame side of the disk.

6. A disk drive device as claimed in claim 5, wherein the rotor is rotation-controlled by the detection signal of the first position detecting means when the recording disk is mounted on the turn table of the brushless motor with an information recording region on a surface of the disk facing the motor-frame side, and the rotor is rotation-controlled by the detection signal of the second position detecting means when the recording disk is mounted on the turn table with the surface of the disk facing an opposite side relative to the motor-frame side.

* * * * *